United States Patent [19]

Prickett

[11] 4,059,282
[45] Nov. 22, 1977

[54] BOAT BOW DOLLY

[76] Inventor: Ervin Prickett, 11331 Kumquat St., Coon Rapids, Minn. 55433

[21] Appl. No.: 721,394

[22] Filed: Sept. 8, 1976

[51] Int. Cl.² .............................................. B60P 3/10
[52] U.S. Cl. ...................... 280/47.13 B; 280/79.1 A; 280/414 A
[58] Field of Search .................. 280/47.13 R, 47.13 B, 280/47.2, 47.26, 47.3, 47.31, 47.32, 414 A, 78, 79.1 R, 79.1 A; 190/18 A; 16/30; 9/1.2

[56] References Cited

U.S. PATENT DOCUMENTS

| 1,413,852 | 4/1922 | Hokkanen | 280/47.13 R |
| 1,709,972 | 4/1929 | Dibsdale | 16/30 |
| 2,361,592 | 10/1944 | Bjork | 280/47.3 X |

Primary Examiner—Joseph F. Peters, Jr.
Assistant Examiner—R. Schrecengost
Attorney, Agent, or Firm—Allen D. Brufsky

[57] ABSTRACT

A dolly for wheeling a boat from a car to a body of water and back including a wheel on a bracket removably received within a slot formed by a pair of depending flanges on a mounting plate secured to the bow of the boat. The bracket is removably locked in place in the slot between the flanges by a pair of spring clips on the plate in front of and in back of the slot. The wheel bracket and wheel is removable from the slot when the boat is launched into the water by raising the wheel bracket to clear one of the clips at the front of the slot.

4 Claims, 4 Drawing Figures

BOAT BOW DOLLY

BACKGROUND OF THE INVENTION

The present invention relates to a wheel attachment for small boats carried on a car top to provide mobility for ease of moving the boat from the car to the water and back.

Many boat owners and users transport their pleasure boats on trailers or car tops to lakes or other bodies of water and upon their arrival or departure therefrom are required to carry, drag or roll the boat to and from the water. This is somewhat of a difficult task, especially if the boat is heavy and the distance traversed is substantial. This invention provides a removable wheeled attachment or dolly adapted to be mounted on the bow of the boat to eliminate this chore and is designed for use by a single person in moving the boat.

SUMMARY OF THE INVENTION

In accordance with the invention, a mounting plate is fixed by fasteners to the bow of the boat. The plate includes a pair of depending flanges forming a V-shaped slot open along its apex to receive a complementally shaped bracket rotatably mounting a wheel. The bracket is slid over a resilient U-shaped, spring retaining clip on the plate in front of the slot and held between a pair of such clips on the plate in front and back of the slot. Prior to launching the boat into the water, the bracket is raised and the wheel removed by sliding it out of the slot over the front clip.

BRIEF DESCRIPTION OF THE DRAWING

Further objects and advantages of the invention will become apparent from the following description and claims, and from the accompanying drawing, wherein:

DETAILED DESCRIPTION OF THE PREFERRED EMBODIMENT

Figure 1:
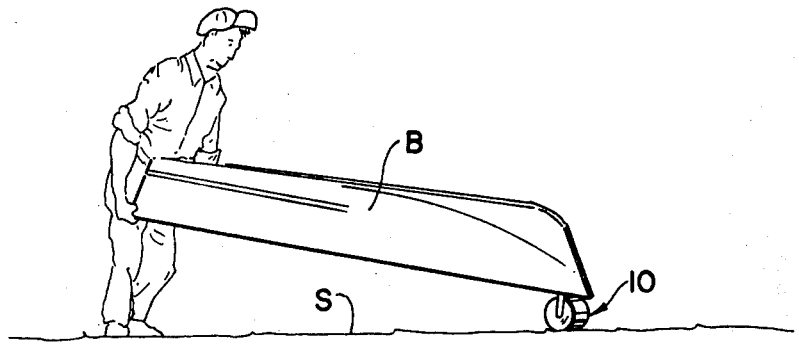
FIG. 1 is a perspective view of the dolly of the present invention mounted on the bow of a boat.
Figure 2:
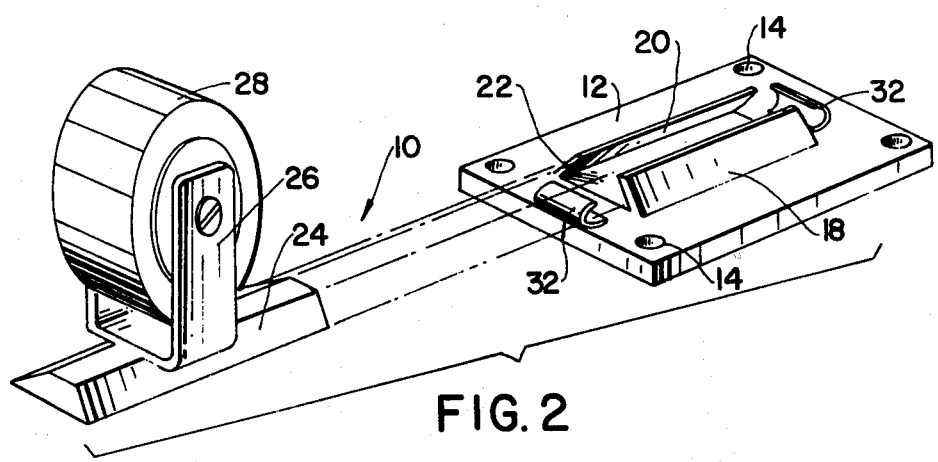
FIG. 2 is an exploded perspective view of the dolly of FIG. 1 turned upside down.

Referring now to the drawing in detail, wherein like numerals indicate like elements throughout the several views, the boat dolly 10 of the present invention includes a mounting plate 12 having openings 14 adapted to receive suitable fasteners 16 for mounting plate 12 on the bow of a boat B.

Plate 12 has a pair of depending flanges 18, 20, forming a substantially V-shaped slot 22 open along its apex to receive a complementally-shaped bracket 24 integral with the top or bight of a U-shaped channel 26 rotatably mounting a wheel 28 on an axle 30 between the arms of channel 26.

Mounting plate 12 includes a U-shaped resilient clip 32 at the front and back of slot 22. One of the legs of each clip 32 are attached to plate 12, and the clips 32 open towards each other and the front and back of slot 22.

Figure 3:
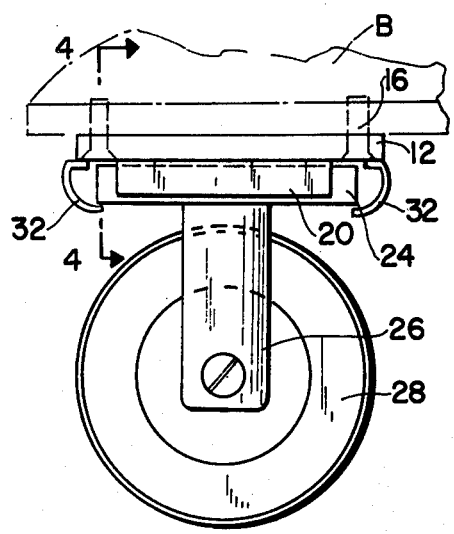
FIG. 3 is a side view in elevation of the assembled dolly of FIG. 2 mounted on the boat.
Figure 4:
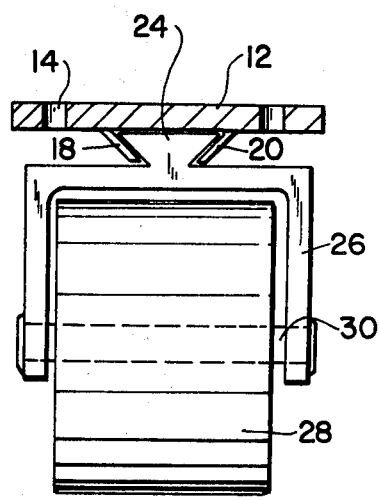
FIG. 4 is a cross-sectional view taken substantially along the plane indicated by line 4—4 of FIG. 3.

Normally wheel bracket 24 is detached from plate 12. However, when it is necessary to transport boat B on dry land, bracket 24 is slid over the free leg of clip 32 in front of slot 22 into the slot into engagement with the interior of clip 32 at the rear of slot 22. When in abutment with the rear clip 32, the bracket 24 will be dropped and will be retained on plate 12 by engagement with the front and rear clips 32, and the depending flanges 18 and 20, as shown in FIGS. 3 and 4, so boat B can be wheeled along surface S.

Prior to launching boat B into the water, bracket 24 is raised and removed from plate 12 by sliding it out of slot 22 over the front clip 32.

I claim:

1. A dolly for transporting a boat over a surface comprising:
    a substantially planar mounting plate adapted to be secured to the bow of a boat, and
    a wheel bracket including a wheel rotatably mounted thereon removably secured to said mounting plate, said mounting plate including
    depending flange means forming a slot for receiving said wheel bracket, and
    means for removably locking said wheel bracket on said plate in said slot, said removable locking means including a substantially U-shaped resilient clip on said mounting plate in front and back of said slot, said clips including a free leg and a bight portion facing each other and said slot.

2. The dolly of claim 1 wherein said flange means includes
    a pair of flanges forming a substantially V-shaped slot without an apex, and
    said wheel bracket includes
    a complemental V-shaped bracket received within said slot between said flanges.

3. The dolly of claim 2 wherein said wheel bracket includes a depending U-shaped channel connected to said V-shaped bracket, and a wheel rotatably mounted between the legs of said U-shaped channel.

4. The dolly of claim 3 wherein said mounted plate includes a plurality of fastener receiving openings.

* * * * *